US011926047B2

(12) United States Patent
Cambronero

(10) Patent No.: US 11,926,047 B2
(45) Date of Patent: Mar. 12, 2024

(54) SYSTEMS AND METHODS FOR FACILITATING SURGICAL PRACTICE

(71) Applicant: The Regents of the University of California, Oakland, CA (US)

(72) Inventor: Neil Cambronero, San Francisco, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 299 days.

(21) Appl. No.: 17/359,541

(22) Filed: Jun. 26, 2021

(65) Prior Publication Data
US 2021/0402624 A1    Dec. 30, 2021

Related U.S. Application Data

(60) Provisional application No. 63/044,754, filed on Jun. 26, 2020.

(51) Int. Cl.
| *B25J 21/00* | (2006.01) |
| *B25J 9/02* | (2006.01) |
| *B25J 9/16* | (2006.01) |
| *G09B 23/28* | (2006.01) |

(52) U.S. Cl.
CPC ............. *B25J 21/00* (2013.01); *B25J 9/02* (2013.01); *B25J 9/1664* (2013.01); *B25J 9/1669* (2013.01); *G09B 23/28* (2013.01)

(58) Field of Classification Search
CPC ........ B25J 21/00; B25J 9/1669; B25J 9/1664; B25J 9/02; G09B 23/28
See application file for complete search history.

(56) References Cited

U.S. PATENT DOCUMENTS

| 5,149,270 | A | 9/1992 | Mckeown | |
| 5,873,732 | A | 2/1999 | Hasson | |
| 10,847,057 | B2* | 11/2020 | Felsinger | G09B 23/30 |
| 10,861,352 | B2* | 12/2020 | Perkins | G09B 23/28 |
| 11,030,922 | B2* | 6/2021 | Velasco | G09B 23/285 |
| 11,120,708 | B2* | 9/2021 | Hofstetter | G09B 23/30 |
| 11,484,379 | B2* | 11/2022 | Sutherland | A61B 90/90 |
| 2012/0115117 | A1 | 5/2012 | Marshall | |
| 2014/0106328 | A1 | 4/2014 | Loor | |
| 2018/0174491 | A1 | 6/2018 | Sauer | |

OTHER PUBLICATIONS

International Search Report and Written Opinion, International Application PCT/US2021/039275, dated Sep. 30, 2021 (10 pages).

* cited by examiner

*Primary Examiner* — Dalena Tran
(74) *Attorney, Agent, or Firm* — Thomas|Horstemeyer, LLP

(57) ABSTRACT

A surgical practice system including a box that defines an inner compartment, and multiple articulable arms mounted to the box within the inner compartment, each arm including a gripping element provided at its distal end that is configured to grip an object.

19 Claims, 8 Drawing Sheets

SYSTEMS AND METHODS FOR FACILITATING SURGICAL PRACTICE

CROSS-REFERENCE TO RELATED APPLICATION

This application claims priority to U.S. Provisional Application Ser. No. 63/044,754, filed Jun. 26, 2020, which is hereby incorporated by reference herein in its entirety.

BACKGROUND

Surgical training programs struggle with the issue of how to train residents with restricted working hours. Less time in the hospital means less time in the operating room and, therefore, fewer opportunities to become accustomed to performing life-saving surgical procedures, which entail suturing together patient tissues. Examples include replacing or repairing a diseased aorta or its branches, performing a cardiac valve replacement, and coronary artery bypass surgery. In addition, recent worldwide events resulting in social distancing and isolation, even among medical professionals and trainees in hospital settings, have led to a dramatic decrease in semi-elective cardiovascular surgical operations. The result on surgical trainees and cardiovascular trainees is a decrease in total operative experience.

Needed is an apparatus that enables medical professionals, including residents, to practice such procedures in their free time outside of the operating room.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, needed are means that enable medical professionals, such as residents, to practice surgical procedures on their own outside of the operating room. Disclosed herein are surgical practice systems with which such procedures can be practiced. In some embodiments, a surgical practice system comprises a portable box that can be used to position and support simulated tissues for the purpose of enabling the medical professional to practice connecting them together. The box defines a compartment in which are mounted articulable arms that can be adjusted into nearly any position and orientation, and hold that position/orientation. Mounted to the distal end of each arm is a gripping element that can be used to grip objects, such as the simulated tissues. During use, the arms can be used to hold the simulated tissues in positions/orientations that emulate those of actual human tissues and the medical professional can practice performing a surgical procedure on the "tissues."

In the following disclosure, various specific embodiments are described. It is to be understood that those embodiments are example implementations of the disclosed inventions and that alternative embodiments are possible. Such alternative embodiments include hybrid embodiments that include features from different disclosed embodiments. All such embodiments are intended to fall within the scope of this disclosure.

Challenges in the development of a device that enables medical professionals, including residents, to practice medical procedures, such as sewing or "suturing" maneuvers, lie in the fact that the human vascular anatomy exists in numerous angles and depths within the body. Needed is a system to familiarize the user (surgeon or trainee) that enables simulated tissues to be placed at various angles, positions, and heights to accurately represent the anatomic constraints found in the operating room during live operations. Such a system preferably would be easily portable and fully contained so that an individual can travel with the apparatus to training centers and sites outside of the operating room and hospital, such as a place of residence, to practice in isolation with the goal of improving operative skills.

Figure 2:
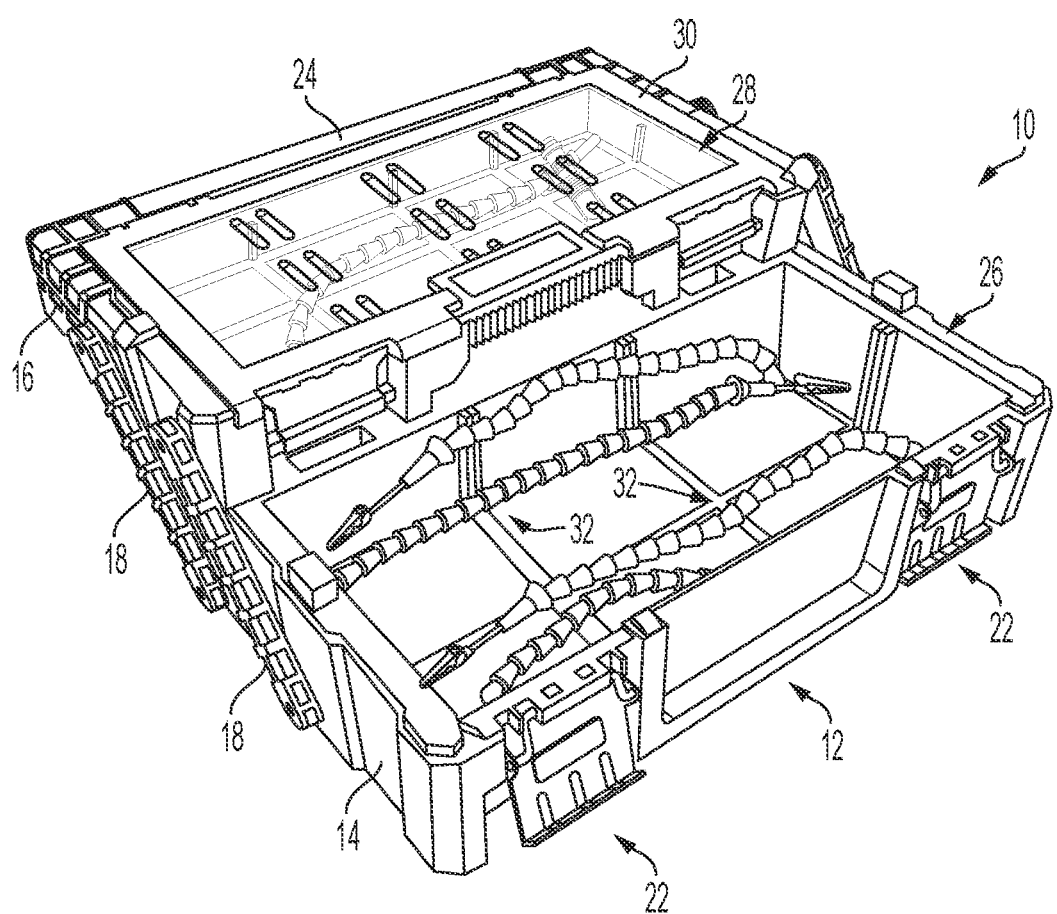
FIG. 2 is a top perspective view of the box of FIG. 1, the box shown in an open position.
Figure 3:
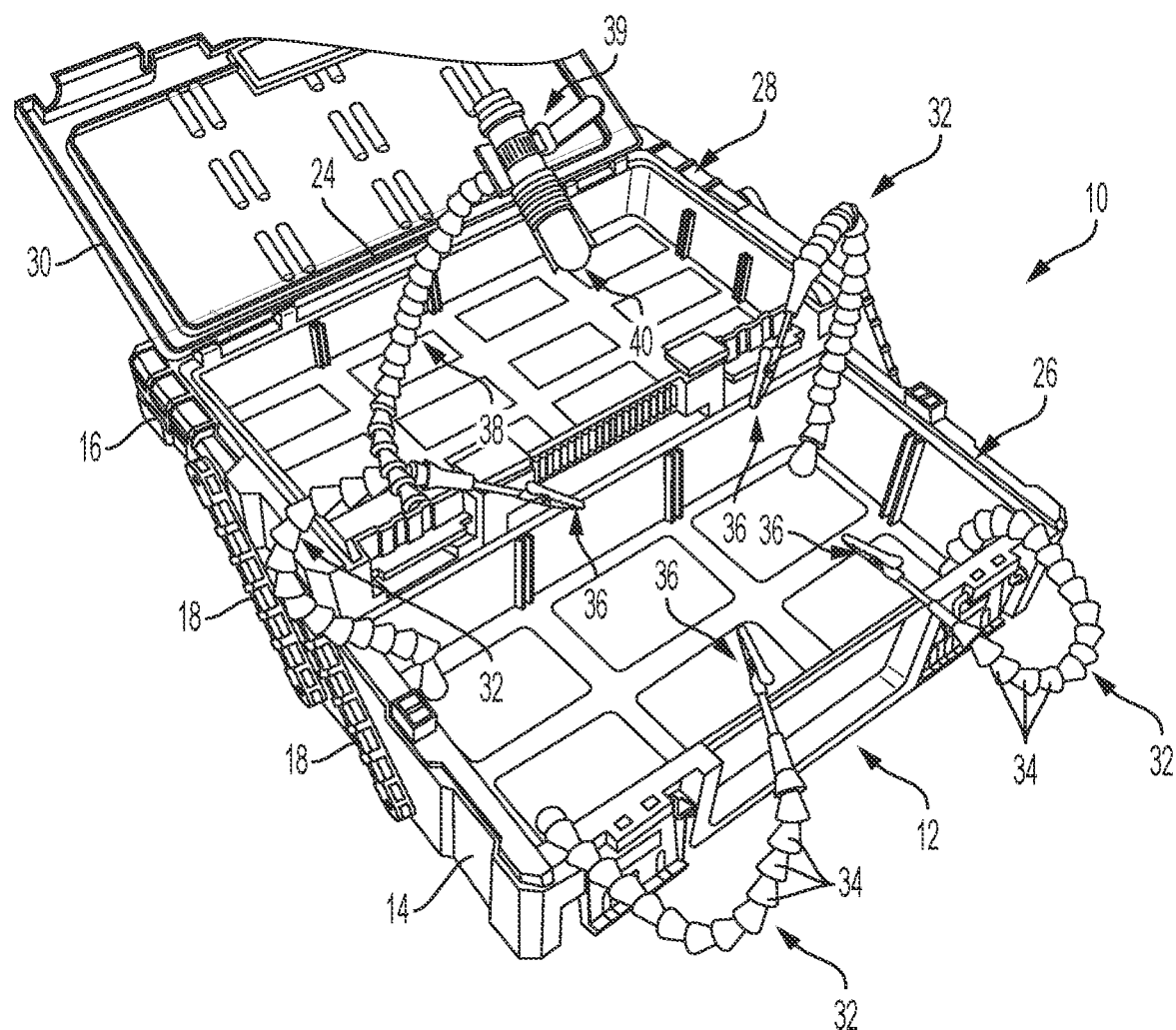
FIG. 3 is a top perspective view of the box of FIG. 1 illustrating articulable arms mounted within the box.
Figure 4:
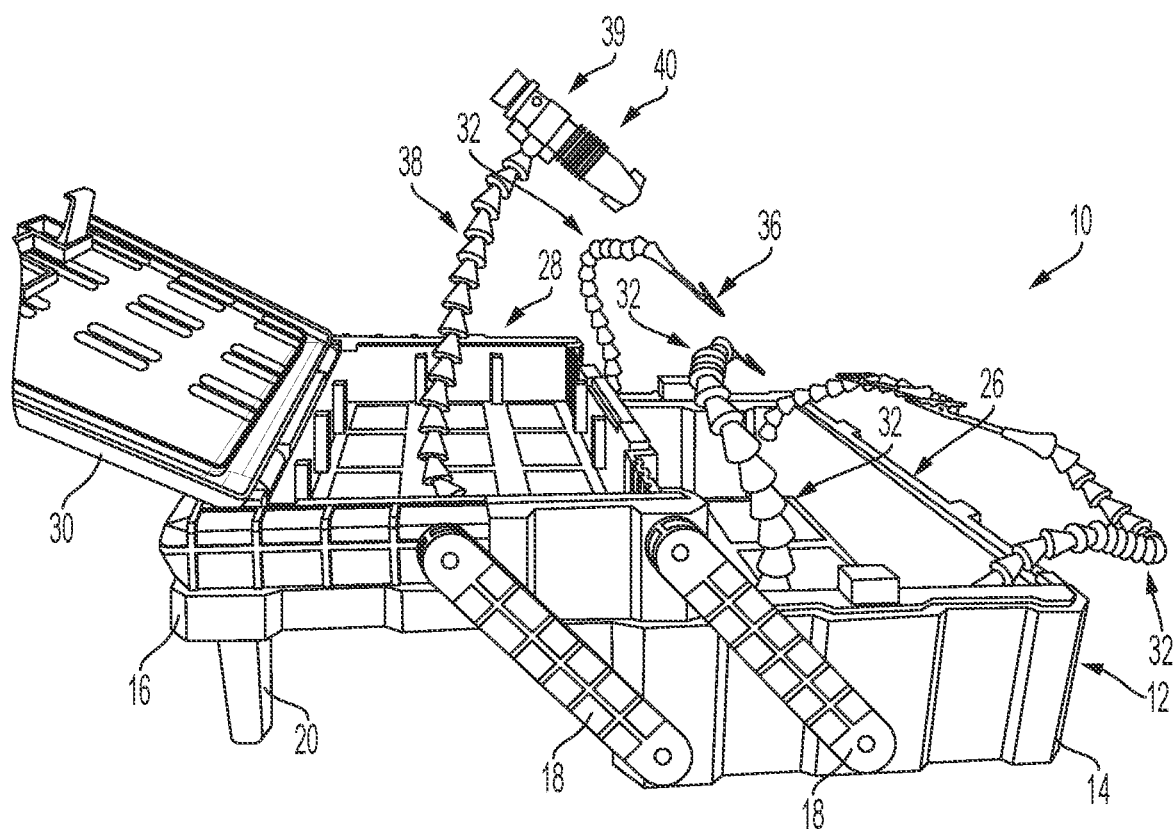
FIG. 4 is a side perspective view of the box of FIG. 1 illustrating its articulable arms in various positions and orientations.

FIGS. 1-4 illustrate an example embodiment of a surgical practice system 10 in accordance with the present disclosure. Beginning with FIG. 1, the system 10 generally comprises a portable cantilevered box 12 that is similar in design to a tool or tackle box. The box 12 has a bottom member 14 and a top member 16, which is pivotally connected to the bottom member. More specifically, the top member 16 is connected to the bottom member 14 with pivot arms 18 that, as is apparent from FIG. 2, enable the top member 16 to be pivoted upward and backward relative to the bottom member 14 to open the box 12. Because of the pivot arms 18, the top member 16 is maintained in a level orientation before, as, and after the box 12 is opened. As shown in FIG. 4, the top member 16 includes support legs 20 that support the top member 16 when the box 12 is open.

Figure 1:
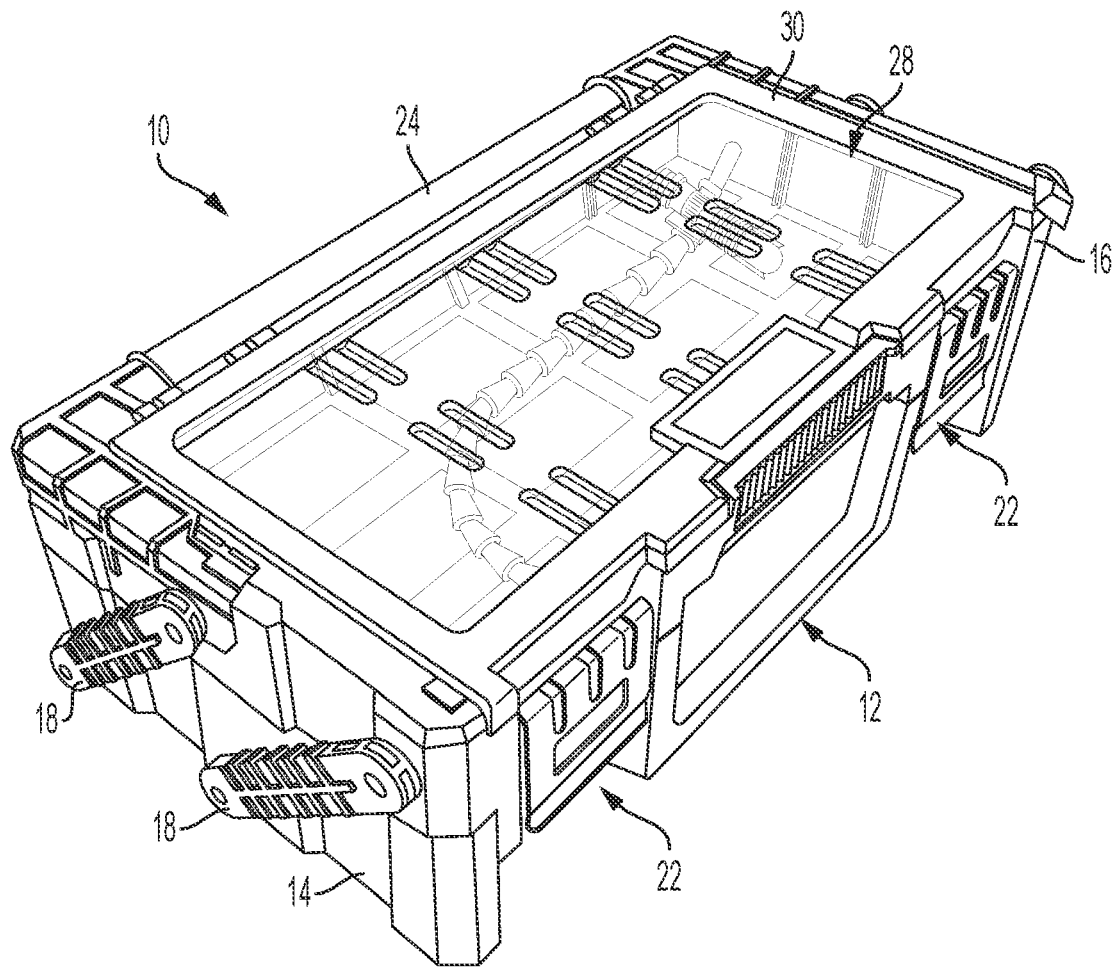
FIG. 1 is a top perspective view of an embodiment of a box of a surgical practice system, the box shown in a closed position.

When the box 12 is in the closed position shown in FIG. 1, the top member 16 can be secured to the bottom member 14 with one or more locking elements 22, such as one or more latches, and the box can be carried using a pivotable handle 24. When the box 12 is in the open position shown in FIG. 2, one may access a bottom compartment 26 defined by the bottom member 14. The top member 16 also defines a top compartment 28 that can be covered with a hinged lid 30.

With further reference to FIG. 2, mounted within the bottom compartment 26 are articulable arms 32 that can be used to support objects, such as simulated tissue or practice modules (described below). In some embodiments, the arms 32 are mounted to a bottom wall of the bottom member 14, although they alternatively can be mounted to one or more side walls of the bottom member. When the box 12 is first opened, the articulable arms 32 can be in a folded orientation shown in FIG. 2, which enables closing and locking of the box.

Referring next to FIG. 3, each articulable arm 32 comprises a plurality of arm segments 34 that are connected together in series to form the length of the arm. Each segment 34 is capable of being pivoted relative to an adjacent segment to enable the arm 32 to be positioned in numerous different positions and orientations. In some embodiments, each segment 34 forms a ball-and-socket joint with an adjacent segment to enable such flexibility. Regardless of the type of joint that is used, each joint has an inherent stiffness that holds the joint, and therefore the arm 32, in whatever position/orientation into which it is placed. Accordingly, each arm 32 can be moved and fixed in nearly any position or orientation chosen by the user. As shown most clearly in FIG. 4, a gripping element, such as a clip 36, is provided at the free distal end of each arm 32. The clips 36 can be used to securely hold objects that facilitate the surgery practice. In some embodiments, the clips 36 are spring biased toward the closed position and have jaws can be temporarily opened by pinching proximal ends of the clip together against the force of the springs. In the embodiment shown in FIGS. 1-4, the system 10 includes four articulable arms 32 mounted within the bottom compartment 26.

In FIGS. 3 and 4, the lid 20 of the top member 16 is shown in an open position that provides access to the top compartment 28. As is shown in these figures, a further articulable arm 38 can be mounted within that compartment 28. In this example, the arm 38 is mounted to a side wall of the top member 16. Instead of having a clip at its distal end, however, the arm 38 supports a mounting element 39 that can be used to support any one of a number of useful devices, such as electrical devices. In the example of FIGS. 3 and 4, the mounting element 39 supports a light source 40, such as a small flashlight, which can be used to provide illumination for surgery practice sessions. In other embodiments, however, the mounting element 39 could be used to support another electronic device, such as a smart phone or a camera.

Figure 5:
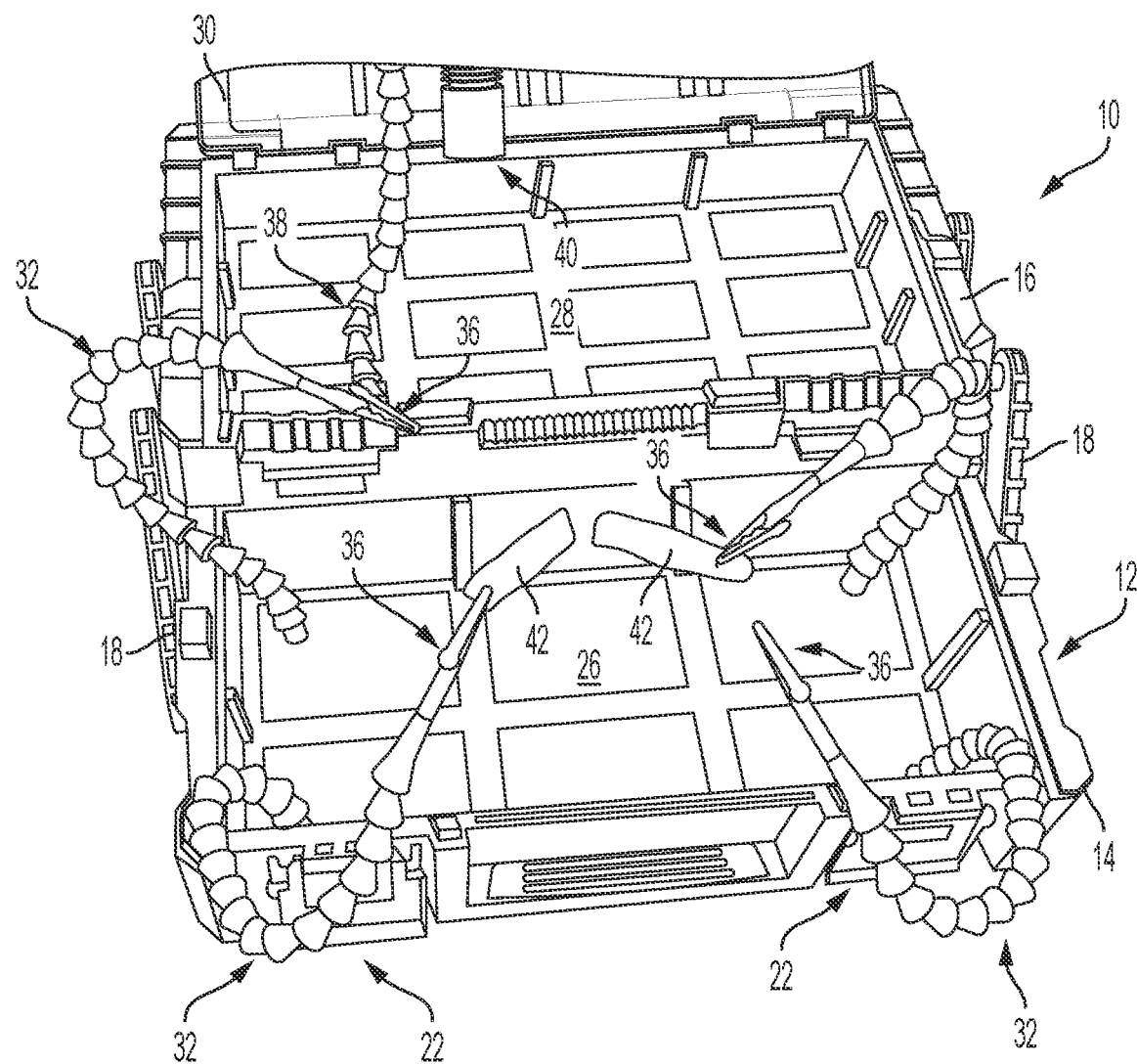
FIG. 5 is a top perspective view of the box of FIG. 1 illustrating two articulable arms supporting two sections of tubing that can be sutured together as surgical practice.
Figure 6:
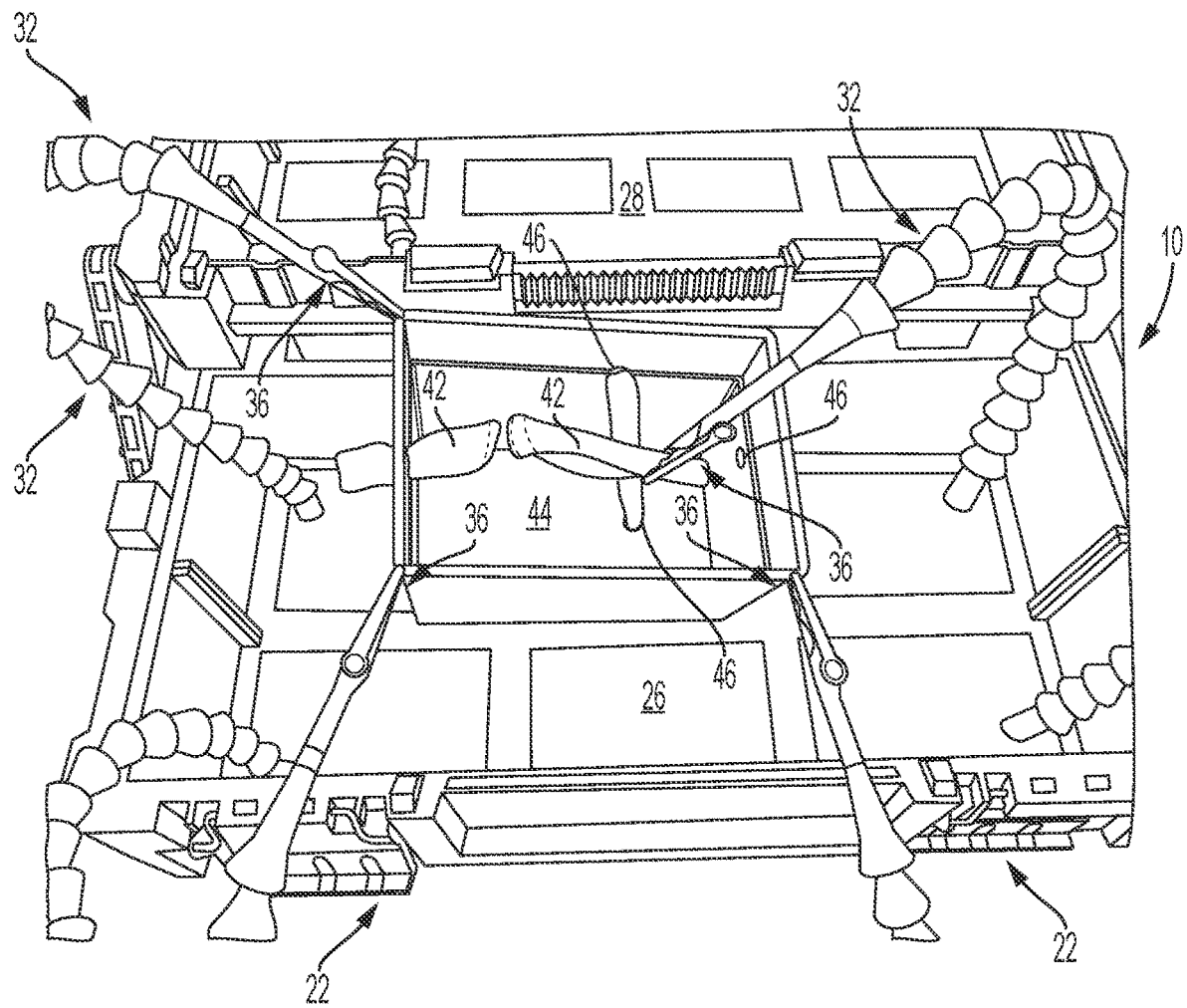
FIG. 6 is a top perspective view of the box of FIG. 1 illustrating two articulable arms supporting a practice module over an inner compartment of the box.

FIGS. 5 and 6 illustrate two example uses of the surgical practice system 10. Beginning with FIG. 5, two of the articulable arms 32 and their clips 36 have been used to support two sections of tubing 42, which emulate two vessels that are to be sutured together. As can be appreciated from this figure, the two tube sections 42 have been positioned with the arms 32 so that their ends are close together and, therefore, in a position in which a user (e.g., resident) can practice suturing the two sections together to form a continuous length of tubing (vessel). The orientation, angle, and height within the bottom container 12 can be changed by the user to best simulate the position of structures encountered during a live operation. An example is connecting a synthetic graft to the leg vessels when performing vascular bypass surgery deep within the leg or shoulder.

Turning to FIG. 6, illustrated is an example practice module 44 that can also be used to practice surgical procedures. The module 44 is supported using the arms 32. Specifically, the clips 36 of the arms 32 grip flanges formed at the top edges of the walls of the module 44. The module 44 is configured as a small open box and has multiple openings 46 at different depths formed through the walls of the module enabling placement of simulated tissues deep within a cavity, as is found in live operations. As shown in FIG. 6, further tube sections 42 can be passed through these openings 46 to position and orient the tube sections in a position and orientation that emulates those of vessels within the body to provide a realistic context for the "surgery" that is to be performed by the user. The articulable arms 32 enable additional spatial modification as each module 44 can then be positioned at different angles and depths within the bottom compartment 26 of the container 12 to most accurately simulate human anatomy. In some embodiments, the module 44 simulates the anatomy for procedures performed on cardiovascular structures in deep cavities by connecting two structures end-to-end or connecting the end of one structure to the side of another. Examples include repairing or replacing a diseased aorta. In some embodiments, multiple modules 44 can be either included with the system 10 or made separately available that are individually configured to emulate other specific surgical procedures to enable the user to practice the particular procedures that the user will be expected to perform on a living patient. As is further shown in FIG. 6, indicia, such as small dots, can be provided at the ends of the tube sections 42 to provide guidance as to where the user should pass a needle through the sections in order to connect the two ends together with sutures.

Figure 7:
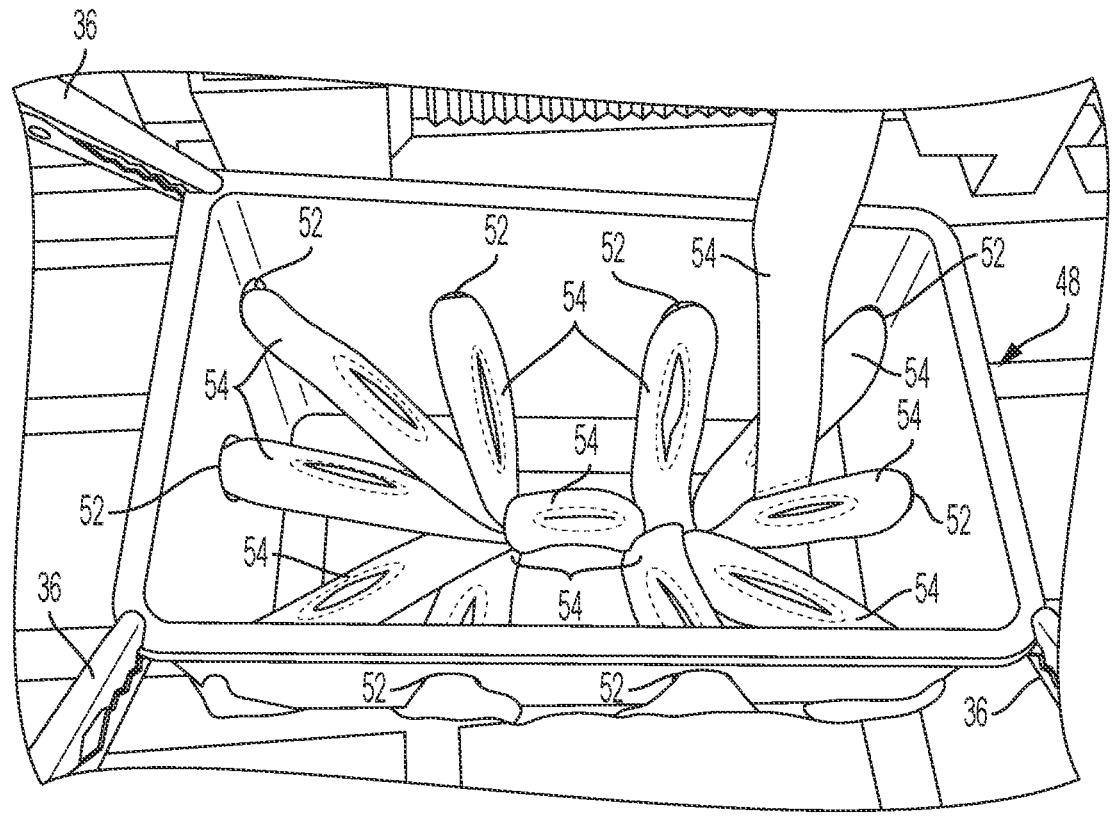
FIG. 7 is a top perspective view of a further practice module that can be used with the box of FIG. 1.
Figure 8:
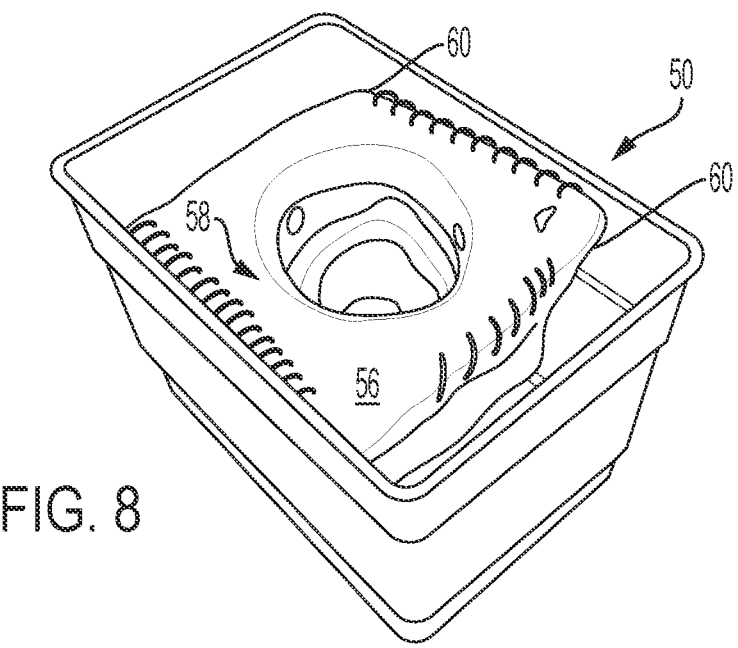
FIG. 8 is a top perspective view of a further practice module that can be used with the box of FIG. 1.

FIGS. 7 and 8 illustrate further example practice modules 48 and 50, respectively. As shown in FIG. 7, the module 48 also is formed as an open box and includes several openings 52 through which sections of tubing 54 can be passed. In this example, the tube sections 54 comprise elliptical openings that represent openings that are made in coronary arteries, i.e., the blood vessels which supply blood to the heart. These openings 52 are made when performing coronary artery bypass surgery. This is the most common procedure performed by cardiovascular surgeons. Coronary arteries exist on the surface of the elliptical heart and are encountered at various angles with each patient's anatomy differing from one another. The module 48 enables the user to simulate placing sutures through an opened coronary artery at a variety of angles. Manipulating the position of the module 48 within bottom compartment 26 enables the user to most accurately simulate the anatomic constraints encountered when performing a coronary bypass procedure deep within the chest cavity. The user can simulate performing an actual connection of a bypass graft to a coronary artery (coronary bypass) by lowering simulated tissue vessel 54 into the field, attached to articulable arm 32. The end of vessel 54 is sewn to one of the openings in the simulated vessels 54 within module 48, as shown in FIG. 7. The user can practice performing coronary artery bypass connections at an infinite number of angles as the module 48 can be held in any position. The articulable arms 32 enable the modules to be tilted or rotated to any position. This connection is the most common site for a coronary bypass to fail. The module 48 enables the user to gain experience with performing this connection. Indicia at their ends aid the user in attaching the sections together.

In FIG. 8, the module 50 contains a sponge 56 having an opening 58 formed therein. The module 50 replicates the inside of the aorta at the level of the aortic valve. This anatomic region is known as the aortic root. The simulated tissue is created from open cell polyurethane foam. Replacing the aortic valve is an open heart operation and is the second most common surgery performed by the cardiovascular surgeon. The ridges 60 seen within the simulated aortic root represent the aortic annulus where the diseased leaflets of the aortic valve were connected. Prior to replacement of the aortic valve, the leaflets are cut out. To replace the valve, the surgeon must place sutures through this ridge to hold the bioprosthetic valve. The user can gain experience in placing sutures from the bottom up across this ridge, exactly as is necessary during replacement of the aortic valve. Unlike other surgical procedures in which sewing or "suturing" is performed from the right to the left, sutures are placed from bottom up through the horizontal aortic annulus. The module 50 enables the user to practice this unorthodox type of suture placement. The simulated tissues in the module 50 can be placed at the bottom of the module and the module can then be placed within the bottom compartment 26 to create a similar environment encountered during a live operation with the aortic root residing deep within the heart, which is deep within the chest cavity. Further adjustments of the articulable arms 32 and the module 50 can be made to replicate the exact angle which live tissues will be encountered at such depth in the human body during live operations.

Figure 9:
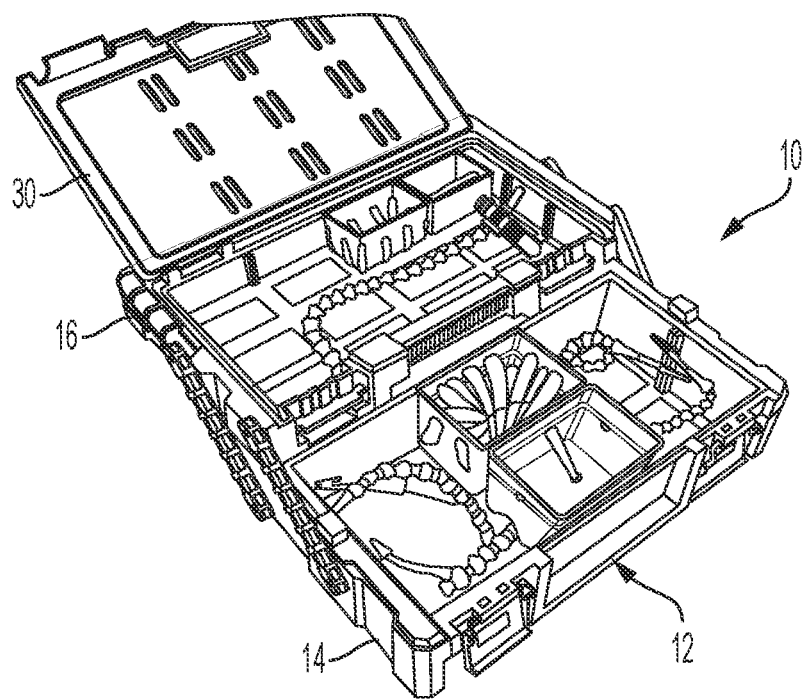
FIG. 9 is a top perspective view of the box of FIG. 1 illustrating practice modules contained within compartments of the box.
Figure 10:
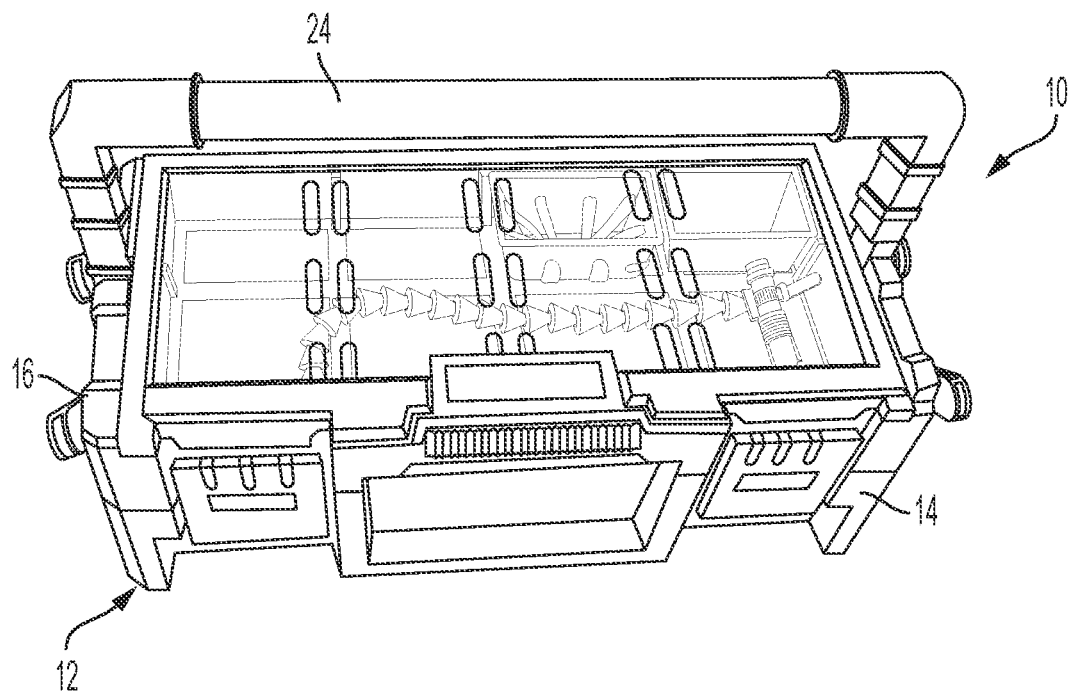
FIG. 10 is a top perspective view of the box of FIG. 1 illustrating the box containing practice modules being ready for transport using a handle.

As noted above, the practice modules can be small in size. In such a case, the modules can be stored within the bottom compartment 26, the top compartment 28, or both, as shown in FIG. 9, to store and transport them along with the box 12. The box 12 can then be closed and locked, as shown in FIG. 10, and the box can be carried to a desired location using the handle 24.

The invention claimed is:

1. A surgical practice system comprising:
a portable box including a bottom member and a top member, the top member being pivotally connected to the bottom member such that the top member is configured to be pivoted upward and backward relative to the bottom member when the box is opened, the bottom member including a bottom compartment, the top member including a top compartment, wherein when the box is opened and the top member is pivoted upward and backward, access is provided to the bottom compartment;
a carrying handle mounted to the top member;
multiple articulable arms mounted within the bottom compartment of the bottom member, each articulable arm having inherent stiffness that holds the arm in whatever position and orientation into which it is placed, each articulable arm further including a gripping element provided at a distal end of the articulable arm that is configured to grip an object; and
a further articulable arm mounted within the top compartment of the top member, the further articulable arm having inherent stiffness that holds the arm in whatever position and orientation into which it is placed, the further articulable arm further including a mounting element provided at a distal end of the articulable arm that is configured to support an object.

2. The system of claim 1, further comprising an electrical device that the mounting element of the further articulable arm is configured to support.

3. The system of claim 2, wherein the electrical device comprises one of a light source, smart phone, or camera.

4. The system of claim 1, wherein each articulable arm comprises a plurality of arm segments arranged in series, each segment connected to one or more adjacent segments at a joint, wherein each arm segment can be pivoted relative to one or more adjacent arm segments to change the position and orientation of the articulable arm.

5. The system of claim 4, wherein the joints of the articulable arms are ball-and-socket joints.

6. The system of claim 1, further comprising a practice module sized and configured to fit within the portable box when closed, the practice module being configured to be supported by the articulable arms.

7. The system of claim 6, wherein the practice module is configured as a further box including a bottom wall and side walls.

8. The system of claim 7, wherein the bottom and side walls of the further box include openings through which sections of tubing can be passed to enable a user to practice connecting ends of the sections of tubing together to simulate suturing two sections of a vessel together.

9. The system of claim 8, further comprising sections of tubing sized and configured to pass through the openings of the practice module.

10. The system of claim 1, wherein the bottom and top compartments each include a bottom wall and multiple side walls.

11. The system of claim 1, further comprising a hinged lid mounted to the top member that is pivotable between a closed orientation in which the lid closes the top compartment and an open orientation in which the top compartment is open.

12. The system of claim 1, wherein the bottom and top members of the portable box are pivotally connected to each other with pivot arms that maintain the top member in a level orientation when the box is opened.

13. A method for practicing a surgical procedure, the method comprising:
opening a portable box including a bottom member and a top member, the top member being pivotally connected to the bottom member such that the top member pivots upward and backward relative to the bottom member when the box is opened to provide access to a compartment of the bottom member, the box further including multiple articulable arms mounted within the compartment, each articulable arm having inherent stiffness that holds the arm in whatever position and orientation into which it is placed, each articulable arm further including a gripping element provided at a distal end of the articulable arm that is configured to grip an object;
positioning sections of tubing in proximity to each other above or within the compartment of the bottom member using the articulable arms; and
suturing ends of the sections of tubing together.

14. The method of claim 13, wherein the sections of tubing are gripped by the gripping elements of the articulable arms.

15. The method of claim 13, wherein the sections of tubing extend through openings formed through walls of a practice module that is supported by the articulable arms.

16. The method of claim 15, wherein the practice module is gripped by the gripping elements of the articulable arms.

17. The method of claim 15, wherein the practice module is sized and configured to fit within the compartment of the bottom member of the portable box when closed.

18. The method of claim 13, wherein each articulable arm comprises a plurality of arm segments arranged in series, each segment connected to one or more adjacent segments at a joint, wherein each arm segment can be pivoted relative to one or more adjacent arm segments to change the position and orientation of the articulable arm.

19. The method of claim 18, wherein the joints of the articulable arms are ball-and-socket joints.

\* \* \* \* \*